United States Patent
Won et al.

(10) Patent No.: US 12,355,068 B2
(45) Date of Patent: Jul. 8, 2025

(54) NEGATIVE ACTIVE MATERIAL FOR RECHARGEABLE LITHIUM BATTERY, AND RECHARGEABLE LITHIUM BATTERY INCLUDING SAME

(71) Applicant: SAMSUNG SDI CO., LTD., Yongin-si (KR)

(72) Inventors: Jongmin Won, Yongin-si (KR); Young-Min Kim, Yongin-si (KR); Jaemyung Kim, Yongin-si (KR); Jaehou Nah, Yongin-si (KR); Changsu Shin, Yongin-si (KR); Dae-Hyeok Lee, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 194 days.

(21) Appl. No.: 17/097,659

(22) Filed: Nov. 13, 2020

(65) Prior Publication Data

US 2021/0151746 A1  May 20, 2021

(30) Foreign Application Priority Data

Nov. 19, 2019  (KR) .......................... 10-2019-0148721

(51) Int. Cl.
*H01M 4/36* (2006.01)
*H01M 4/02* (2006.01)
(Continued)

(52) U.S. Cl.
CPC ........... *H01M 4/366* (2013.01); *H01M 4/386* (2013.01); *H01M 4/625* (2013.01); *H01M 4/628* (2013.01);
(Continued)

(58) Field of Classification Search
CPC ...... H01M 4/366; H01M 4/386; H01M 4/625; H01M 4/628; H01M 10/0525; H01M 2004/021; H01M 2004/027
See application file for complete search history.

(56) References Cited

U.S. PATENT DOCUMENTS

2006/0147797 A1* 7/2006 Wu ...................... H01M 4/0471
429/218.1
2010/0261059 A1  10/2010 Im et al.
(Continued)

FOREIGN PATENT DOCUMENTS

CN    107644983 A    1/2018
JP    2014-002890 A  1/2014
(Continued)

OTHER PUBLICATIONS

Masakazu Haruta, Morphology changes and long-term cycling durability of Si flake powder negative electrode for lithium-ion batteries, Elsevier Feb. 12, 2018) (Year: 2018).*

(Continued)

*Primary Examiner* — Matthew T Martin
*Assistant Examiner* — Bartholomew A Hornsby
(74) *Attorney, Agent, or Firm* — Lee IP Law, P.C.

(57) ABSTRACT

A negative active material for a rechargeable lithium battery and a rechargeable lithium battery including the same, the negative active material including secondary particles of agglomerated primary particles, the primary particles including Si particles and a first ceramic oxide on a surface of the Si particles; and amorphous carbon, wherein the amorphous carbon surrounds a surface of the primary particles and a surface of the secondary particles.

9 Claims, 6 Drawing Sheets

(51) Int. Cl.
  *H01M 4/38* (2006.01)
  *H01M 4/62* (2006.01)
  *H01M 10/0525* (2010.01)
(52) U.S. Cl.
  CPC .. *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 2011/0206986 A1* | 8/2011 | Inagaki | H01M 4/1395 252/182.1 |
| 2013/0337314 A1 | 12/2013 | Essaki et al. | |
| 2014/0050983 A1 | 2/2014 | Kim et al. | |
| 2014/0057176 A1* | 2/2014 | Park | H01M 4/1391 429/231.8 |
| 2015/0017527 A1 | 1/2015 | Lee et al. | |
| 2017/0104210 A1* | 4/2017 | Shin | H01M 4/483 |
| 2017/0117535 A1* | 4/2017 | Yoon | H01M 4/1391 |
| 2017/0294644 A1* | 10/2017 | Burshtain | H01M 4/0471 |
| 2018/0026257 A1* | 1/2018 | Oh | H01M 4/386 429/231.8 |
| 2018/0069231 A1* | 3/2018 | Kim | H01M 4/1395 |
| 2018/0083272 A1* | 3/2018 | Son | H10N 10/855 |
| 2018/0269475 A1* | 9/2018 | Oh | H01M 4/364 |
| 2018/0375094 A1* | 12/2018 | He | C01B 33/021 |
| 2019/0312257 A1* | 10/2019 | Ishiwatari | H01M 4/62 |
| 2019/0312264 A1 | 10/2019 | Shin et al. | |
| 2019/0341602 A1* | 11/2019 | Matsuno | H01M 10/0525 |
| 2020/0058924 A1* | 2/2020 | Pang | H01M 4/386 |

FOREIGN PATENT DOCUMENTS

| | | |
|---|---|---|
| KR | 10-2010-0113826 A | 10/2010 |
| KR | 10-2015-0008327 A | 1/2015 |
| KR | 10-2016-0128279 A | 11/2016 |
| KR | 10-2018-0091156 A | 8/2018 |
| KR | 10-2019-0116818 A | 10/2019 |

OTHER PUBLICATIONS

Miao Wang, A multiphysics microstructure-resolved model for silicon anode lithium-ion batteries, Elsevier Mar. 3, 2017 (Year: 2017).*
Wang et al. (A multiphysics microstructure-resolved model for silicon anode lithium-ion batteries, Elsevier Mar. 3, 2017) (Year: 2017).*
Haruta et al. (Morphology changes and long-term cycling durability of Si flake powder negative electrode for lithium-ion batteries, Elsevier Feb. 12, 2018). (Year: 2018).*
Chinese Office action and Search Report dated Dec. 27, 2023.
Korean Office action dated Feb. 3, 2025.
U.S. Office action received in co-pending U.S. Appl. No. 18/739,459, dated Dec. 18, 2024.

* cited by examiner

NEGATIVE ACTIVE MATERIAL FOR RECHARGEABLE LITHIUM BATTERY, AND RECHARGEABLE LITHIUM BATTERY INCLUDING SAME

CROSS-REFERENCE TO RELATED APPLICATION

Korean Patent Application No. 10-2019-0148721, filed on Nov. 29, 2019, in the Korean Intellectual Property Office, and entitled: "Negative Active Material for Rechargeable Lithium Battery, and Rechargeable Lithium Battery Including Same," is incorporated by reference herein in its entirety.

BACKGROUND

1. Field

Embodiments relate to a negative active material for a rechargeable lithium battery and a rechargeable lithium battery including the same.

2. Description of the Related Art

A rechargeable lithium battery has recently drawn attention as a power source for small portable electronic devices. The rechargeable lithium battery may use an organic electrolyte solution and may have a twice or higher discharge voltage than a battery using an alkali aqueous solution, and accordingly, may have high energy density.

As for a positive active material of a rechargeable lithium battery, a lithium-transition metal oxide having a structure capable of intercalating lithium ions, such as $LiCoO_2$, $LiMn_2O_4$, $LiNii_{1-x}Co_xO_2$ ($0<x<1$), and the like may be used.

The above information disclosed in this Background section is only for enhancement of understanding of the background of the invention, and therefore it may contain information that does not form the prior art that is already known in this country to a person of ordinary skill in the art.

SUMMARY

The embodiments may be realized by providing a negative active material for a rechargeable lithium battery, the negative active material including secondary particles of agglomerated primary particles, the primary particles including Si particles and a first ceramic oxide on a surface of the Si particles; and amorphous carbon, wherein the amorphous carbon surrounds a surface of the primary particles and a surface of the secondary particles.

The first ceramic oxide may be in the form of a continuous layer on the surface of the Si particles, or discontinuous islands or dots on the surface of the Si particles.

The first ceramic oxide on the surface of the Si particles may have a thickness of about 50 nm or less.

Particles of the first ceramic oxide may have a size of about 20 nm or less.

The amorphous carbon may further include a second ceramic oxide therein.

Particles of the second ceramic oxide may have a size of about 30 nm or less.

The second ceramic oxide may include $ZrO_2$, $Al_2O_3$, $Al_2TiO_5$, $SiO_2$, or a combination thereof.

The first ceramic oxide may include $ZrO_2$, $Al_2O_3$, $Al_2TiO_5$, $SiO_2$, or a combination thereof.

The negative active material may include the first ceramic oxide in an amount of about 0.1 wt % to about 5 wt %, based on a total weight of the negative active material.

Regarding the negative active material, a peak intensity ratio (($I_{Si(111)}/I_{(ceramic\ oxide)}$) of a peak intensity ($I_{Si(111)}$) at a Si(111) plane relative to a peak intensity (($I_{(ceramic\ oxide)}$) of the first ceramic oxide may be about 0.2 to about 10, as measured by X-ray diffraction analysis using a CuKα ray.

The Si particle may be a flake type particle.

The Si particles may have an aspect ratio of about 3 to about 15.

The Si particles may have a particle diameter of about 10 nm to about 200 nm.

A full width at half maximum, FWHM(111), of a diffraction peak at a (111) plane found by X-ray diffraction of the Si particles using a CuKα ray may be about 0.4 degrees to about 5 degrees.

The embodiments may be realized by providing a rechargeable lithium battery including a negative electrode including the negative active material according to an embodiment; a positive electrode; and an electrolyte.

BRIEF DESCRIPTION OF THE DRAWINGS

Features will be apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout. As used herein, the terms "first", "second", and the like do not imply sequential inclusion of the described elements.

A negative active material for a rechargeable lithium battery according to one embodiment may include secondary particles in which primary particles are agglomerated (e.g., secondary particles of agglomerated primary particles); and amorphous carbon. The primary particles may include Si particles and a ceramic oxide on a surface of the Si particles. The amorphous carbon may surround a surface of the primary particles and may also surround a surface of the secondary particles.

In an implementation, the ceramic oxide may be discontinuously on the surface of the Si particles in a form of an island or a dot. In an implementation, the ceramic oxide may be continuously on the surface of the Si particle in the form of a layer (e.g., completely or incompletely covering the surface of the composite). For example, the ceramic oxide may be a continuous layer on the surface of the Si particle. In an implementation, the ceramic oxide may completely cover the entire surface of the Si particle.

The ceramic oxide may be on the surface of the Si particles, and the strength may be increased. Furthermore, the ceramic oxide on the surface of the primary particles may help effectively inhibit the volume expansion of the Si particle, which could otherwise occur during the charging and the discharging of the negative active material therewith, and decrease areas of the primary particles which are exposed to the electrolyte, thereby preventing the side reaction of the electrolyte. In an implementation, considering the effect of inhibiting the volume expansion of the Si particles, the ceramic particles may be a continuous layer on the surface of the Si particle.

Figure 1:
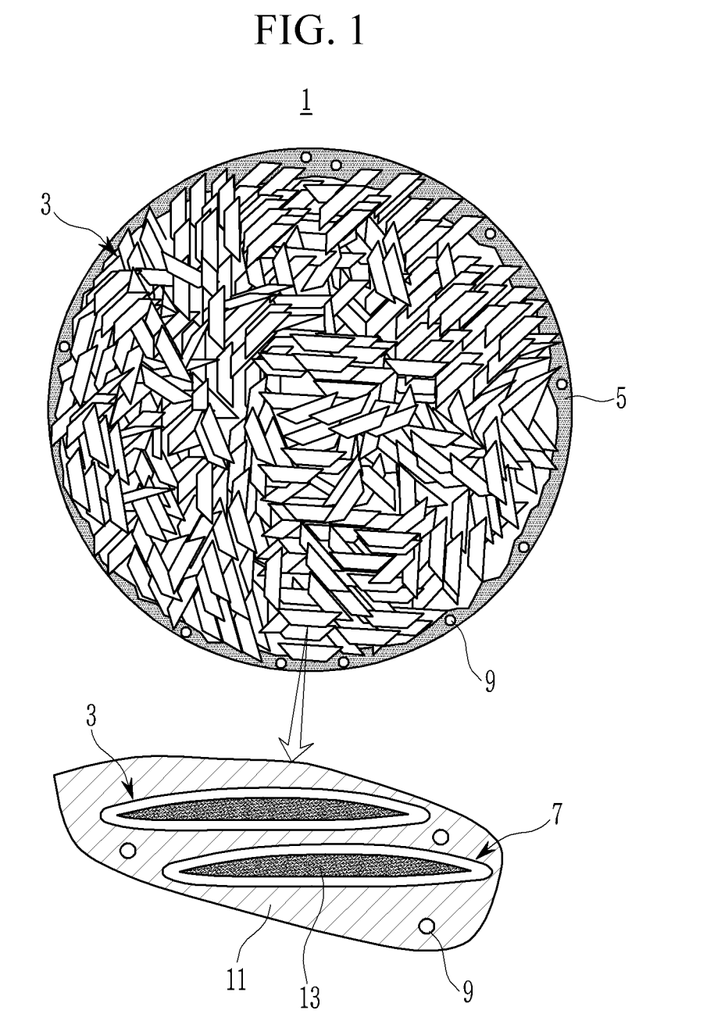
FIG. 1 is a schematic view showing a structure of a negative active material according to one embodiment.

FIG. 1 schematically shows the negative active material according to one embodiment. As shown in FIG. 1, a negative active material 1 may include secondary particles of agglomerated primary particles 3, and amorphous carbon 5 surrounding or coating the surface of the secondary particles. In an implementation, the secondary particles may be inside of the active material, and the amorphous carbon may be outside (e.g., may form an exterior) of the active material.

In an implementation, as illustrated in the enlarged part of FIG. 1, a first amorphous carbon 11 may be filled between the primary particles, so that the first amorphous carbon 11 may be on the surface of the primary particles 3, thereby surrounding the surface of the primary particles. When the amorphous carbon is filled between the primary particles 3, it may effectively prevent direct exposure of silicon primary particles to the electrolyte, so that a more stable interface may be formed and volume expansion of the silicon nanoparticles may be effectively buffered. In addition, the amorphous carbon on the surface of the primary particles (e.g., by filling between the primary particles) may act as a passage through which electrons may be transferred between the silicon nanoparticles and the electrolyte to help further improve the conductivity and to reduce the resistance of the electrode.

The primary particles 3 may include the Si particles 13 and the ceramic oxide 7 on the surface of the Si particles 13. In an implementation, as illustrated in the partial enlarged drawing of FIG. 1, the ceramic oxide 7 may be continuously on the surface of the Si particles 13 in the form of a layer. In an implementation, the ceramic oxide may be discontinuously on the surface of the Si particles in the form of an island or a dot.

The ceramic oxide may include, e.g., $ZrO_2$, $Al_2O_3$, $Al_2TiO_5$, $SiO_2$, or a combination thereof. When the ceramic oxide, which has excellent mechanical strength and has little or no reactivity with the electrolyte, is on the surface of the Si particles, breakage of the active material due to the volume expansion due to a reaction of Si with lithium may be prevented, and a surface of the Si particles exposed to the electrolyte may be minimized, thereby improving the long cycle-life characteristics. If the ceramic were a carbide or a nitride, instead of an oxide, the ceramic carbide or ceramic nitride may expand and contract. Accordingly, the effect for inhibiting structure breakage of the active material may not be obtained.

The ceramic oxide on the surface of the Si particles may have a thickness of about 50 nm or less, e.g., about 2 nm to about 50 nm. Herein, the thickness of the ceramic oxide indicates a length or distance from the surface of the Si particles to an outermost surface of the ceramic oxide, regardless of the form of the ceramic oxide, e.g., layer, island, or dot. For example, when the ceramic oxide is in the form of the layer, the thickness is a thickness of the layer, and when the ceramic oxide is in the form of an island or a dot, the thickness is a distance from the surface of the Si particles to an outermost surface (e.g., peak) of the island or is a diameter of the dot (e.g., when the dot is spherical).

When the thickness of the ceramic oxide is within the range, the mechanical strength of the finally prepared negative active material may be improved to more effectively prevent the occurrence of cracks during charging/discharging, and the occurrence of the interface which directly contacts the Si particles and the electrolyte may be effectively suppressed, so that the long cycle-life characteristics may be obtained.

The ceramic oxide may have a size of about 20 nm or less, e.g., about 2 nm to about 20 nm or about 2 nm to about 10 nm. When the size of the ceramic oxide is about 20 nm or less, the capacity of the final negative active material may be suitably obtained, the mechanical strength of the active material may be improved, while the electrical conductivity may not be largely affected, so that the occurrence of cracks may be effectively inhibited during the charging/discharging. Furthermore, the occurrence of an interface directly contacting the Si particles and the electrolyte may be effectively suppressed, so that the long cycle-life characteristics may be obtained.

As used herein, the "size" of the ceramic oxide may be a particle diameter, e.g., an average particle diameter of the particle diameters. Herein, the average particle diameter may be a D50 average particle diameter which is measured by cumulative volume. Such a D50 average particle diameter indicates an average particle diameter where a cumulative volume is about 50 volume % in a particle distribution, when a definition is not otherwise provided.

In an implementation, an amount of the ceramic oxide may be about 0.1 wt % to about 5 wt %, based on the total weight, 100 wt %, of the negative active material. In an implementation, a mixing ratio of the ceramic oxide and the silicon may be about 0.02:1 to about 0.5:1 by weight.

The amount of the ceramic oxide within the range may provide a suitable capacity of the final negative active material, and may help improve the mechanical strength of the active material, without a large effect on the electrical conductivity, during the charging/discharging. Furthermore, the occurrence of the interface, e.g., due to direct contact between the Si particles and the electrolyte, may be effectively suppressed, so that the long cycle-life characteristics may be obtained.

As illustrated in FIG. 1, in the negative active material according to one embodiment, the amorphous carbon 5 surrounding the secondary particles may further include a second ceramic oxide 9. In an implementation, as shown in FIG. 1, the second ceramic oxide 9 may also be in the first amorphous carbon 11 filled between the primary particles 3.

The second ceramic oxide may include, e.g., $ZrO_2$, $Al_2O_3$, $Al_2TiO_5$, $SiO_2$, or a combination thereof. The second ceramic oxide may be obtained from part of the produced ceramic oxide which is on the amorphous carbon layer, rather than the surface of the Si particles according to a mixing ratio of the Si and the ceramic during formation to position the ceramic oxide (hereinafter referred to as "first ceramic oxide") on the surface of the Si particles of the negative active material preparation. In an implementation, the second ceramic oxide may be the same (e.g., material) as the first ceramic oxide.

The second ceramic oxide may have a D50 average particle diameter of about 30 nm or less, e.g., about 5 nm to about 30 nm. When the D50 average particle diameter of the second ceramic oxide is about 30 nm or less, it may effectively act to mechanically maintain the structure of the active material and to help suppress the mechanical stress during charging/discharging.

As such, when the second ceramic oxide is further included in the amorphous carbon surrounding the surface of the secondary particles, the stress due to the volume expansion during charging and discharging may be suppressed, as the second ceramic oxide has good mechanical strength.

When the negative active material further includes the second ceramic oxide, e.g., regardless of including the second ceramic oxide in the amorphous carbon on the surface of the secondary particle or the amorphous carbon on the surface of the primary particle surface, the total weight of the ceramic oxide may be within the range of about 0.1 wt % to about 5 wt %, as the second ceramic oxide is the same to the first ceramic oxide.

In an implementation, regarding the negative active material, a peak intensity ratio ($I_{Si(111)}$/I(ceramic oxide)) of a peak intensity ($I_{Si(111)}$) at a Si(111) plane relative to a peak intensity ($I_{(ceramic\ oxide)}$) of a ceramic oxide is about 0.2 to about 10 measured by X-ray diffraction analysis using a CuKα ray. The peak intensity ratio may be a height ratio of a peak height at a Si(111) plane relative to a peak height of the ceramic oxide, e.g., in case of using $ZrO_2$ as the ceramic oxide, the peak intensity ratio ($I_{Si(111)}/I_{(ZrO2)}$) may be a peak height at a Si(111) plane relative to a peak height of the $ZrO_2$.

When the peak intensity ratio ($I_{Si(111)}$/(ceramic oxide)) of the negative active material is within the range, a uniform mixture of the Si particles and the ceramic oxide may be formed so that the electrical conductivity may not be adversely affected, and the mechanical strength of the secondary particle may be effectively improved. If the peak intensity ratio ($I_{Si(111)}/I_{(ceramic\ oxide)}$) of the negative active material were to be less than 0.2, e.g., if the peak at the ceramic oxide were to be extremely high, the electrical conductivity or capacity could be abruptly decreased.

The X-ray diffraction analysis may be measured by using a CuKα ray as a target ray, and herein, the X-ray diffraction analysis may be measured under a general condition, e.g., a measurement condition of 2θ=10° to 50°, a scan speed (°/S) of 0.04 to 0.08, a step size (°/step) of 0.013 to 0.27, and time per step of 40 s to 80 s. The peak intensity ratio ($I_{Si(111)}/I_{(ceramic\ oxide)}$) indicates the ratio of the peak intensity ($I_{Si(111)}$) at a Si(111) plane relative to the peak intensity ($I_{Si(111)}/I_{(ceramic\ oxide)}$) of a ceramic oxide, e.g., a relative value, so that it may be understood that the peak intensity ratio ($I_{Si(111)}/I_{(ceramic\ oxide)}$) may not be substantially changed, even though the absolute values of the peak intensity $I_{(ceramic\ oxide)}$ of a ceramic oxide and the peak intensity ($I_{Si(111)}$) at a Si(111) plane may be varied, depending on the X-ray diffraction analysis conditions.

The Si particles may be a flake type. In an implementation, the Si particles may be a flake type having a long axis and a short axis. In an implementation, the Si particles may have an aspect ratio (long axis/short axis, e.g., width/thickness) of about 3 to about 15. When the aspect ratio of the Si particles is within the range, the direction of the volume expansion stress of the Si particles does not largely work on a short axis, so that the entire stress may be controlled to improve the cycle-life characteristics.

The Si particles may have a particle diameter of about 10 nm to about 200 nm. The particle diameter may be an average particle diameter of the particle diameters. Herein, the average a particle diameter may be a particle diameter which is measured by cumulative volume. Such a D50 average particle diameter indicates an average particle diameter where a cumulative volume is about 50 volume % in a particle distribution, when a definition is not otherwise provided. When the D50 average particle diameter of the Si particles is within the range, the secondary particles including the Si particles may be readily prepared and the volume expansion stress which is applied to each Si particle during charging and discharging is small, and thus, the cycle-life characteristics may be improved.

In an implementation, a full width at half maximum, FWHM(111), of a diffraction peak at a (111) plane found by X-ray diffraction of the Si particles using a CuKα ray may be about 0.4 degrees(°) to about 5 degrees(°). When the full width at half maximum, FWHM(111), of the Si particles is within the range, the size of the unit Si (e.g., primary particles) which react with Li ions during charging and discharging may be reduced, so that the structure of the active material may be well maintained and the cycle-life characteristics may be improved.

An amount of the Si in the negative active material may be about 20 wt % to about 65 wt %, based on the total weight, 100 wt %, of the negative active material. When the amount of Si is within the range, the amorphous carbon may sufficiently surround the primary particles and the secondary particles, and thus, the volume expansion rate may be reduced during charging and discharging, and the primary particles and the secondary particles may have good contact with the amorphous carbon which acts as a passage for transferring electrons during charging and discharging, thereby improving the rate capability.

In an implementation, a thickness of the amorphous carbon on the surface of the secondary particles and surrounding the secondary particles may be about 20 nm to about 500 nm. When the amorphous carbon has the thickness of the above range, the interface of the electrolyte and silicon may be minimized, and it may act as a passage of electrons during charging and discharging, thereby improving rate capability.

In the negative active material according to one embodiment, the amount of the amorphous carbon may be about 20 wt % to about 65 wt %, based on the total weight, 100 wt %, of the negative active material. When the amount of the amorphous carbon is within the range, the amorphous carbon may effectively cover the surface of the primary particles to minimize the side reaction between the Si particles and the electrolyte, thereby further improving the cycle-life characteristics.

In an implementation, the secondary particles may have a D50 average particle diameter of about 4 μm to about 20 μm. When the D50 average particle diameter of the secondary particles is within the range, the final negative active material may be uniformly mixed with a conductive material, a binder, and the like in the negative active material composition preparation, so that the stress applied to the negative electrode during charging and discharging may be reduced, and the advantages related to the negative electrode expansion and the long cycle-life characteristics may be obtained.

The negative active material according to one embodiment may be prepared by the following procedure.

First, the silicon particles may be prepared. The silicon particles may be bulk silicon with a particle diameter of about 10 μm to about 150 μm. In an implementation, as the silicon particles, nano-silicon particles prepared using silane chemical vapor deposition may be used, rather than the bulk silicon.

The silicon particles and a ceramic oxide precursor may be mixed in a solvent to prepare a mixed solution. A mixing ratio of the silicon particles and the ceramic oxide precursor may be controlled to obtain a mixing ratio of silicon and ceramic of about 1:0.02 to about 1:0.1 by weight.

The ceramic oxide precursor may include, e.g., zirconium acetylacetonate, zirconium nitrate, zirconium tetrachloride, aluminum nitrate, aluminum chloride, aluminum phosphate, tetraethyl orthosilicate, or a combination thereof.

The solvent may include, e.g., isopropyl alcohol, ethanol, butanol, N-methylpyrrolidone, propylene glycol, or a combination thereof.

In an implementation, during the mixing, a dispersing agent may be further added. The dispersing agent may include, e.g., stearic acid, polyvinyl pyrrolidone, ethylene glycol, citric acid, or a combination thereof.

In case of further using the dispersing agent, a mixing ratio of the silicon particles and the dispersing agent may be about 99:1 to about 60:40 by weight. When the mixing ratio is within the range, the silicon particles may be effectively dispersed in the solvent and the amorphous carbon may well surround the surface of the primary particles and the secondary particles.

The mixing may be performed by using a bead mill or a ball mill, which may cause pulverization of the bulk silicon to a nanometer size, and the mixing may be performed to have a D50 average particle diameter of the pulverized silicon particles reach about 10 nm to about 200 nm.

The mixing may be performed for about 6 hours to about 36 hours.

When the amount of the ceramic precursor or the mixing condition is controlled in the mixing process, the type for positioning, e.g., the formation of the ceramic oxide being later generated on the surface, may be controlled. In an implementation, when the ceramic oxide precursor is mixed with the silicon particles in order to obtain the mixing ratio of silicon and ceramic of about 1:0.02 to about 1:0.05 by weight, or alternatively, the mixing is performed for about 6 hours to about 12 hours, the ceramic oxide may be mainly on the surface of the Si particles in the form of an island or a dot. In an implementation, when the ceramic oxide precursor is mixed with the silicon particles in order to obtain the mixing ratio of silicon and ceramic of more than about 1:0.05, and less than 1:0.1 by weight, or alternatively, when the mixing is performed for more than 12 hours and about 36 hours or less, the ceramic oxide may be mainly on the surface of the Si particles in the form of a layer.

The obtained mixed solution may be further uniformly distributed using a homogenizer.

Thereafter, the obtained product may be spray dried. During the spray drying, the ceramic oxide precursor may be on the surface of the silicon particles. Furthermore, the spray drying may cause the part of the ceramic oxide precursor to be included in the amorphous carbon, which may be prepared later according to the mixing ratio of silicon and ceramic in the mixing. In an implementation, when the mixing ratio of silicon and ceramic is about 1:0.05 by weight ratio or more, and about 1:0.1 by weight ratio or less, the one part of the ceramic oxide precursor may be positioned on the surface of the silicon particles and the other part may be positioned on the amorphous carbon.

The spray drying may be performed at about 120° C. to about 200° C. The spray drying may be performed under a condition of a flow amount of the product of about 0.1 ml/min to about 100 ml/min, and a flow amount of a nozzle gas of about 10 L/h to about 100 L/h using a spray nozzle.

When the spray drying is performed under the conditions, the solvent may be substantially completely removed.

According to the spray drying, the solvent may be dried to prepare secondary particles having a substantially spherical shape in which the primary particles are agglomerated. In an implementation, pores may be produced between the primary particles.

The prepared secondary particles may first be heat treated. According to the first heat treatment, the ceramic oxide precursor may form a ceramic oxide. The first heat treatment may be performed at a temperature of about 300° C. to about 400° C. Herein, an atmosphere of the heat treatment may be an air atmosphere, a controlled oxygen atmosphere (in which oxygen gas is limitedly blown while an inert gas atmosphere such as nitrogen or argon gas is maintained), a nitrogen atmosphere, or an argon atmosphere. The heat treatment may be performed for about 1 hour to about 8 hours.

When the first heat treatment is performed in the temperature range and the above atmosphere, the ceramic oxide may be suitably prepared without generation of SiC or growth of Si crystallite.

The obtained secondary particles may be mixed with a second amorphous carbon precursor. In an implementation, a mixing ratio of the secondary particles and the second amorphous carbon precursor may be about 1:1.1 to about 1:0.7 by weight.

The second amorphous carbon precursor may include, e.g., coal pitch, mesophase pitch, petroleum pitch, mesocarbon pitch, coal oil, heavy petroleum oil, or a polymer resin such as a phenol resin, a furan resin, a polyimide resin, or the like.

Regarding the resulting mixture, a secondary heat treatment may be performed to prepare a negative active material for a rechargeable lithium battery. The heat treatment may be performed at about 700° C. to about 1,000° C. When the heat treatment is performed in the temperature range, extreme growth of the Si particles may be suppressed, generation of SiC may be suppressed, and electrical conductivity of the amorphous carbon may be simultaneously improved. The heat treatment may be performed under a $N_2$ atmosphere or an argon atmosphere. According to the secondary heat treatment, the amorphous carbon precursor may form amorphous carbon, which surrounds the surface of the secondary particles. Part of the amorphous carbon may be inserted into or fill in between pores between the primary particles, to be positioned on the surface of the primary particles, in order to surround the surface of the primary particles. When the atmosphere of the second heat treatment is within the above condition, oxidation of silicon and the generation of SiC may be suppressed and the amorphous carbon may be effectively prepared, so that the resistance of the active material may be reduced.

According to one embodiment, a rechargeable lithium battery including a negative electrode, a positive electrode, and an electrolyte is provided.

The negative electrode may include a current collector and a negative active material layer formed on the current collector, and the negative active material includes the negative active material according to one embodiment.

The negative active material layer may further include a crystalline carbon negative active material. The crystalline carbon negative active material may include graphite, e.g., unspecified shaped, sheet-shaped, flake-shaped, spherical-shaped, or fiber-shaped natural graphite, or artificial graphite.

When the negative active material layer includes the negative active material according to an embodiment as a first negative active material, and the crystalline carbon negative active material as a second negative active material, a mixing ratio of the first negative active material to the second negative active material may be about 1:99 to 40:60 by weight. When the first negative active material is within the range, the current density of the negative electrode may be more improved and a thinner electrode may be prepared. Furthermore, the first negative active material including silicon may be uniformly presented in the negative electrode, and thus, the expansion of the negative electrode may be more effectively suppressed.

In the negative active material layer, the negative active material may be included in an amount of 95 wt % to 99 wt % based on the total weight of the negative active material layer.

The negative electrode active material layer may include a negative active material and a binder, and may further include a conductive material. In the negative active material layer, an amount of the binder may be about 1 wt % to about 5 wt %, based on the total weight of the negative active material layer. When the negative active material layer includes a conductive material, the negative active material layer may include about 90 wt % to about 98 wt % of the negative active material, about 1 wt % to about 5 wt % of the binder, and about 1 wt % to about 5 wt % of the conductive material.

The binder adheres negative active material particles to each other well and also adheres negative active materials to the current collector. The binder may include a non-water-soluble binder, a water-soluble binder, or a combination thereof.

The non-water-soluble binder may include an ethylene propylene copolymer, polyacrylonitrile, polystyrene, polyvinylchloride, carboxylated polyvinylchloride, polyvinyl fluoride, polyurethane, polytetrafluoroethylene, polyvinylidene fluoride, polyethylene, polypropylene, polyamide-imide, polyimide, or a combination thereof.

The water-soluble binder may include a styrene-butadiene rubber, an acrylated styrene-butadiene rubber, an acrylonitrile-butadiene rubber, an acryl rubber, a butyl rubber, a fluorine rubber, an ethylene oxide included polymer, polyvinylpyrrolidone, polyepichlorohydrin, polyphosphazene, polyvinylpyridine, chlorosulfonated polyethylene, latex, a polyester resin, an acryl resin, a phenol resin, an epoxy resin, polyvinyl alcohol, or a combination thereof.

When the water-soluble binder is used as a negative electrode binder, a cellulose compound may be further included to provide viscosity as a thickener. The cellulose compound may include carboxymethyl cellulose, hydroxypropyl methyl cellulose, methyl cellulose, or alkali metal salts thereof. The alkali metals may be Na, K, or Li. The thickener may be included in an amount of 0.1 parts by weight to 3 parts by weight, based on 100 parts by weight of the negative active material.

The conductive material may be included to provide electrode conductivity, and a suitable electrically conductive material may be used as a conductive material unless it causes a chemical change. Examples of the conductive material may include a carbon material such as natural graphite, artificial graphite, carbon black, acetylene black, ketjen black, denka black, a carbon fiber, and the like; a metal material of a metal powder or a metal fiber including copper, nickel, aluminum, silver, and the like; a conductive polymer such as a polyphenylene derivative; or a mixture thereof.

The current collector may include a copper foil, a nickel foil, a stainless steel foil, a titanium foil, a nickel foam, a copper foam, a polymer substrate coated with a conductive metal, and a combination thereof.

The negative electrode may be prepared by mixing a negative active material, a binder, and optionally a conductive material in a solvent to prepare an active material composition, and coating the composition on a current collector. The solvent may be water.

The positive electrode may include a positive current collector and a positive active material layer formed on the positive current collector.

The positive active material may include compounds that reversibly intercalate and deintercalate lithium ions (lithiated intercalation compounds). In an implementation, it may include a composite oxide of lithium and cobalt, manganese, nickel, or a combination thereof. Examples thereof may include compounds represented by one of the following chemical formulae. $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_{60}$ ($0.90 \leq a \leq 1.8$, $0 \leq b \leq 0.5$, $0 \leq c \leq 0.5$, $0 \leq \alpha \leq 2$); $Li_aNi_{1-b-c}Co_bX_cO_{2-\alpha}T\alpha$ ($0.90 \leq a \leq 1.8$, $0 \leq b \leq 0.5$, $0 \leq c \leq 0.5$, $0 \leq \alpha \leq 2$); $Li_aNi_{1-b-c}Co_bX_cO_{2-\alpha}T_2$ ($0.90 \leq a \leq 1.8$, $0 \leq b \leq 0.5$, $0 \leq c \leq 0.5$, $0 \leq \alpha \leq 2$); $Li_aNi_{1-b-c}Mn_bX_cD_\alpha$, ($0.90 \leq a \leq 1.8$, $0 \leq b \leq 0.5$, $0 \leq c \leq 0.5$, $0 \leq \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.5$, $0 \leq \alpha \leq 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.5$, $0 \leq \alpha \leq 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $Li_aFePO_4$ ($0.90 \leq a \leq 1.8$).

In the chemical formulae, A may be selected from Ni, Co, Mn, and a combination thereof; X may be selected from Al, Ni, Co, Mn, Cr, Fe, Mg, Sr, V, a rare earth element, and a combination thereof; D may be selected from O, F, S, P, and a combination thereof; E may be selected from Co, Mn, and a combination thereof; T may be selected from F, S, P, and a combination thereof; G may be selected from Al, Cr, Mn, Fe, Mg, La, Ce, Sr, V, and a combination thereof; Q may be selected from Ti, Mo, Mn, and a combination thereof; Z may be selected from Cr, V, Fe, Sc, Y, and a combination thereof; and J may be selected from V, Cr, Mn, Co, Ni, Cu, and a combination thereof.

The compounds may have a coating layer on the surface, or may be mixed with another compound having a coating layer. The coating layer may include a coating element compound, e.g., an oxide of a coating element, a hydroxide of a coating element, an oxyhydroxide of a coating element, an oxycarbonate of a coating element, or a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. In an implementation, the method may include a suitable coating method such as spray coating, dipping, or the like.

In the positive electrode, an amount of the positive active material may be 90 wt % to 98 wt %, based on the total weight of the positive active material layer.

In an implementation, the positive active material layer may further include a binder and a conductive material. In an implementation, each amount of the binder and the conductive material may be about 1 wt % to about 5 wt %, respectively, based on the total weight of the positive active material layer.

The binder improves binding properties of positive active material particles with one another and with a current collector. Examples of the binder may include polyvinyl alcohol, carboxymethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

The conductive material is included to provide electrode conductivity. A suitable electrically conductive material may be used unless it causes a chemical change in a battery. Examples of the conductive material may include a carbon material such as natural graphite, artificial graphite, carbon black, acetylene black, ketj en black, a carbon fiber, and the like; a metal material of a metal powder or a metal fiber including copper, nickel, aluminum, silver, and the like; a conductive polymer such as a polyphenylene derivative; or a mixture thereof.

The current collector may include an aluminum foil, a nickel foil, or a combination thereof.

The positive electrode may be prepared by mixing a positive active material, a binder, and optionally a conductive material in a solvent to prepare an active material composition and coating the active material composition on a current collector. The solvent may include N-methyl pyrrolidone.

The electrolyte may include a non-aqueous organic solvent and a lithium salt.

The non-aqueous organic solvent may serve as a medium for transmitting ions taking part in the electrochemical reaction of a battery.

The non-aqueous organic solvent may include a carbonate, ester, ether, ketone, alcohol, or aprotic solvent.

The carbonate solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester solvent may include methyl acetate, ethyl acetate, n-propyl acetate, t-butyl acetate, methyl propionate, ethyl propionate, propyl propionate, γ-butyrolactone, decanolide, valerolactone, mevalonolactone, caprolactone, and the like. The ether solvent may include dibutyl ether, tetraglyme, diglyme, dimethoxyethane, 2-methyltetrahydrofuran, tetrahydrofuran, and the like. The ketone solvent may include cyclohexanone and the like. The alcohol solvent may include ethanol, isopropyl alcohol, and the like. The aprotic solvent may include nitriles such as R—CN (wherein R is a hydrocarbon group having a C2 to C20 linear, branched, or cyclic structure and may include a double bond, an aromatic ring, or an ether bond) and the like, dioxolanes such as 1,3-dioxolane and the like, and sulfolanes and the like.

The non-aqueous organic solvent may be used alone or in a mixture. When the organic solvent is used in a mixture, the mixture ratio may be controlled in accordance with a desirable battery performance.

The carbonate solvent may be a mixture of a cyclic carbonate and a chain carbonate. In this case, the cyclic carbonate and the chain carbonate may be mixed and used in a volume ratio of 1:1 to 1:9, such that the performance of the electrolyte may be improved.

When the non-aqueous organic solvent is used in a mixture, a mixed solvent of a cyclic carbonate and a chain carbonate; a mixed solvent of a cyclic carbonate and a propionate solvent; or a mixed solvent of a cyclic carbonate, a chain carbonate, and a propionate solvent may be used. The propionate solvent may include methyl propionate, ethyl propionate, propyl propionate, or a combination thereof.

Herein, when the cyclic carbonate and the chain carbonate or the cyclic carbonate and the propionate solvent are mixed, they may be mixed in a volume ratio of about 1:1 to about 1:9, and thus performance of an electrolyte solution may be improved. In addition, when the cyclic carbonate, the chain carbonate, and the propionate solvent are mixed, they may be mixed in a volume ratio of about 1:1:1 to about 3:3:4. The mixing ratios of the solvents may be appropriately adjusted according to desirable properties.

The non-aqueous organic solvent may further include an aromatic hydrocarbon organic solvent in addition to the carbonate solvent. Herein, the carbonate solvent and the aromatic hydrocarbon organic solvent may be mixed in a volume ratio of about 1:1 to about 30:1.

The aromatic hydrocarbon organic solvent may be an aromatic hydrocarbon compound of Chemical Formula 1.

[Chemical Formula 1]

In Chemical Formula 1, $R_1$ to $R_6$ are the same or different and may be selected from hydrogen, a halogen, a C1 to C10 alkyl group, a haloalkyl group, and a combination thereof.

Examples of the aromatic hydrocarbon organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate compound represented by Chemical Formula 2 as an additive for improving the cycle-life of a battery.

[Chemical Formula 2]

In Chemical Formula 2, $R_7$ and $R_8$ are the same or different and may be selected from hydrogen, a halogen, a cyano group (CN), a nitro group ($NO_2$), and a fluorinated C1 to C5 alkyl group, provided that at least one of $R_7$ and $R_8$ is a halogen, a cyano group (CN), a nitro group ($NO_2$), or a fluorinated C1 to C5 alkyl group, and both of $R_7$ and $R_8$ are not hydrogen.

Examples of the ethylene carbonate compound may include difluoro ethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving the cycle-life may be used within an appropriate range.

The electrolyte may further include vinyl ethylene carbonate, propane sultone, succinonitrile, or a combination thereof, and the amount thereof may be suitably controlled.

The lithium salt dissolved in the organic solvent supplies lithium ions in a battery, enables a basic operation of a rechargeable lithium battery, and improves transportation of the lithium ions between positive and negative electrodes. Examples of the lithium salt may include $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide: LiF SI), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$(wherein x and y are natural numbers, for example, an integer of 0 to 20), lithium difluoro(bisoxolato) phosphate, LiCl, LiI, $LiB(C_2O_4)_2$ (lithium bis(oxalato) borate: LiBOB), and lithium difluoro (oxalato) borate (LiDFOB). The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

A separator may be between the positive electrode and the negative electrode depending on a type of the rechargeable lithium battery. Such a separator may include polyethylene, polypropylene, polyvinylidene fluoride, and multi-layers thereof such as a polyethylene/polypropylene double-layered separator, a polyethylene/polypropylene/polyethylene triple-layered separator, a polypropylene/polyethylene/polypropylene triple-layered separator, and the like.

Figure 2:
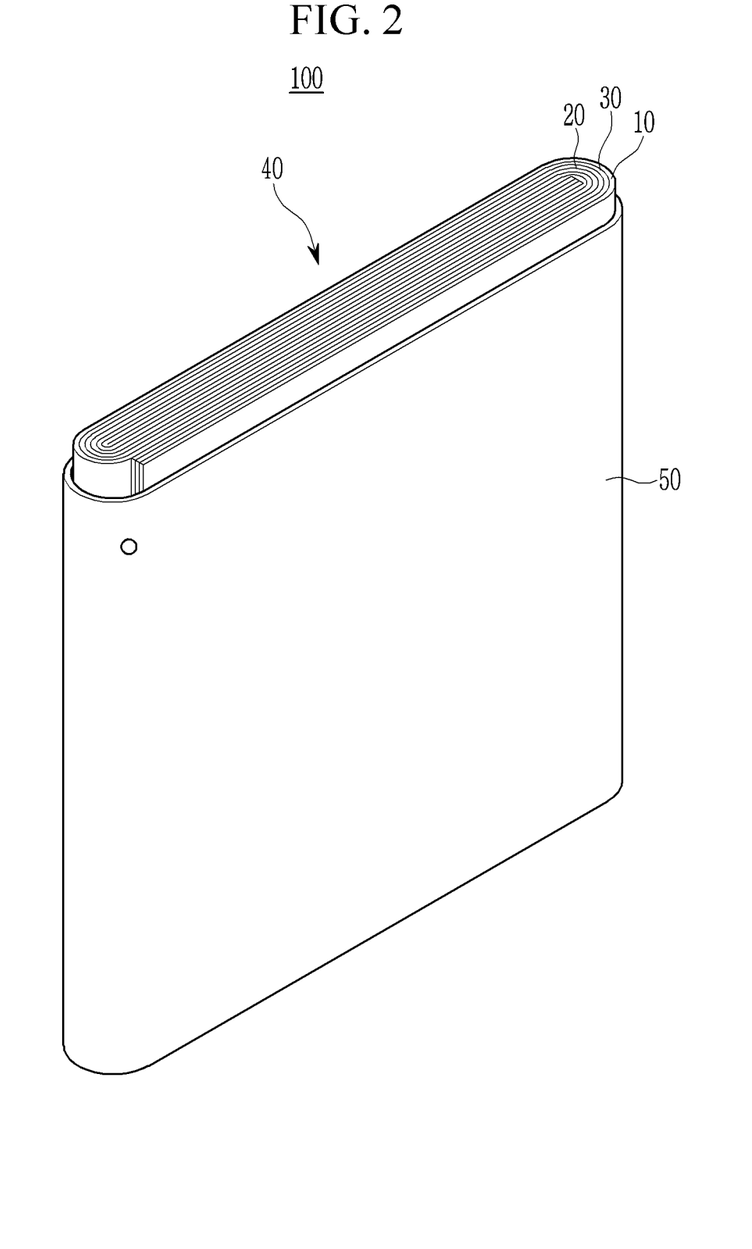
FIG. 2 is a perspective view of a rechargeable lithium battery according to an embodiment.

FIG. 2 is a perspective view of a rechargeable lithium battery according to an embodiment. In an implementation, as illustrated in FIG. 2, the rechargeable lithium battery may be a prismatic battery. In an implementation, the rechargeable lithium battery may include variously-shaped batteries such as a cylindrical or pouch-type battery.

Referring to FIG. 2, a rechargeable lithium battery 100 according to an embodiment may include an electrode assembly 40 manufactured by winding a separator 30 between a positive electrode 10 and a negative electrode 20, and a case 50 housing the electrode assembly 40. The positive electrode 10, the negative electrode 20, and the separator 30 may be impregnated with an electrolyte solution.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

A bulk silicon having a D50 average particle diameter of about 23 μm and a stearic acid dispersing agent were mixed in an ethanol solvent, and $Zr(NO_3)_4$ was added thereto, followed by distributing it for 6 hours using a bead mill. Herein, the mixing ratio of the bulk silicon and the stearic acid dispersing agent was 9:1 by weight, and the amount of the ethanol solvent was used in an amount such that the amount of the silicon and the stearic acid dispersing agent and the amount of the ethanol solvent was 10:110 by weight. The $Zr(NO_3)_4$ was used in an amount such that the amount of the silicon and $Zr(NO_3)_4$ of 9:0.669376 by weight provided Si:Zr of 1:0.02 by weight.

Furthermore, a full width at half maximum, FWHM(111), of a diffraction peak of the prepared Si particles was measured by X-ray diffraction using a CuKα ray, and the result was 0.5 degrees(°). Herein, the X-ray diffraction analysis was measured under a measurement condition of 2θ=10° to 50°, a scan speed (°/S) of 0.054, a step size (°/step) of 0.01313, and time per step of 62.475 s by using a CuKα ray as a target ray. The aspect ratio (width/thickness) of the Si particles was about 7.

The resulting mixture was homogeneously distributed for 30 minutes using a homogenizer.

Thereafter, the prepared homogeneous distributed liquid was spray dried using a spray nozzle. Herein, the spray drying was performed under a condition of a flow amount of the prepared homogeneous distributed liquid of 25 ml/min and a flow amount of a nozzle gas of 40 L/min, at 120° C. The spray drying produced secondary particles by agglomerating the primary particles having a substantially spherical shape.

The produced secondary particles were firstly heat treated at 350° C. under an air atmosphere for 1 hour.

The first heat treatment product was mixed with mesocarbon pitch. Herein, the mesocarbon pitch was used in an amount such that a mixing ratio of silicon and mesocarbon pitch was 9:7.35 by weight (i.e., 1:0.82). The resulting mixture was secondarily heat treated at 800° C. under a $N_2$ atmosphere to prepare a first negative active material.

The prepared first negative active material included secondary particles of agglomerated the primary particles, and the amorphous carbon surrounded the surface of the secondary particles. The primary particles included the Si particles and $ZrO_2$ positioned on the surface of the Si particles in the form of the layer. The D50 average particle diameter of the Si particles was 100 nm, the D50 average particle diameter of $ZrO_2$ was 4 nm, and the layer of $ZrO_2$ had a thickness of 10 nm. The amount of the Si particles was 63.9 wt % based on the total weight, 100 wt %, of the first negative active material, and the amount of $ZrO_2$ was 1.5 wt % based on the total weight, 100 wt %, of the first negative active material. The thickness of the amorphous carbon on the surface of the secondary particles was 200 nm, and the amount of the amorphous carbon was 34.6 wt %, based on the total weight, 100 wt % of the first negative active material.

98 wt % of a mixed active material of the first negative active material and a natural graphite second negative active material (12:88 weight ratio), 1 wt % of a styrene-butadiene rubber binder, and 1 wt % of carboxylmethyl cellulose as an agent for increasing viscosity were mixed in a water solvent to prepare a negative active material slurry. The produced negative active material slurry was coated on a Cu current collector, dried, and compressed to produce a negative electrode including a negative active material layer formed on the current collector.

Using the negative electrode, a lithium metal counter electrode, and an electrolyte, a half-cell was fabricated. As the electrolyte, a 1.5 M $LiPF_6$ solution in a mixed solvent of ethylene carbonate, dimethyl carbonate, and ethyl methyl carbonate (20:40:40 volume ratio) was used.

Example 2

A first negative active material was prepared by the same procedure as in Example 1, except that $Zr(NO_3)_4$ was used in an amount such that the amount of the silicon and $Zr(NO_3)_4$ of 9:2.5354 by weight provided Si:Zr of 1:0.05 by weight.

The prepared first negative active material included secondary particles of agglomerated primary particles, and the amorphous carbon surrounding the surface of the secondary particles. The primary particles included the Si particles and $ZrO_2$ on the surface of the Si particles in the form of the layer. Furthermore, $ZrO_2$ was in the amorphous carbon on the surface of the primary particles and the surface of the secondary particles. Herein, the D50 average particle diameter of the Si particles was 100 nm, the D50 average particle diameter of $ZrO_2$ was 7 nm, and the layer of $ZrO_2$ had a thickness of 12 nm. The amount of the Si particles was 62.2 wt % based on the total weight, 100 wt %, of the first negative active material, and the amount of $ZrO_2$ was 3 wt % based on the total weight, 100 wt %, of the first negative active material. The thickness of the amorphous carbon on the surface of the secondary particles was 200 nm, and the amount of the amorphous carbon was 34.8 wt % based on the total weight, 100 wt %, of the first negative active material.

98 wt % of a mixed active material of the first negative active material and a natural graphite second negative active material (12:88 weight ratio), 1 wt % of a styrene-butadiene rubber binder, and 1 wt % of carboxylmethyl cellulose as an agent for increasing viscosity were mixed in a water solvent to prepare a negative active material slurry. The produced negative active material slurry was coated on a Cu current collector, dried, and compressed to produce a negative electrode including a negative active material layer formed on the current collector.

Using the negative electrode, a lithium metal counter electrode and an electrolyte, a half-cell was fabricated. As the electrolyte, a 1.5 M $LiPF_6$ solution in a mixed solvent of ethylene carbonate, dimethyl carbonate, and ethyl methyl carbonate (20:40:40 volume ratio) was used.

Example 3

A first negative active material was prepared by the same procedure as in Example 1, except that $Zr(NO_3)_4$ was used in an amount such that the amount of the silicon and $Zr(NO_3)_4$ of 9:5.071 by weight provided Si:Zr of 1:0.1 by weight.

The prepared first negative active material included secondary particles secondary particles of agglomerated primary particles, and the amorphous carbon surrounding the surface of the secondary particles. The primary particles included the Si particles and $ZrO_2$ on the surface of the Si particles in the form of a layer. Furthermore, $ZrO_2$ was in the amorphous carbon on the surface of the primary particles and the surface of the secondary particles. Herein, the D50 average particle diameter of the Si particles was 100 nm, the D50 average particle diameter of $ZrO_2$ was 12 nm, and the layer of $ZrO_2$ had a thickness of 15 nm. The amount of the Si particles was 60.0 wt % based on the total weight, 100 wt %, of the first negative active material, and the amount of $ZrO_2$ was 5 wt % based on the total weight, 100 wt %, of the first negative active material. The thickness of the amorphous carbon on the surface of the secondary particles was 200 nm, and the amount of the amorphous carbon was 35 wt % based on the total weight, 100 wt %, of the first negative active material.

98 wt % of a mixed active material of the first negative active material and a natural graphite second negative active material (12:88 weight ratio), 1 wt % of a styrene-butadiene rubber binder, and 1 wt % of carboxylmethyl cellulose as an agent for increasing viscosity were mixed in a water solvent to prepare a negative active material slurry. The produced negative active material slurry was coated on a Cu current collector, dried, and compressed to produce a negative electrode including a negative active material layer formed on the current collector.

Using the negative electrode, a lithium metal counter electrode, and an electrolyte, a half-cell was fabricated. As the electrolyte, a 1.5 M $LiPF_6$ solution in a mixed solvent of ethylene carbonate, dimethyl carbonate, and ethyl methyl carbonate (20:40:40 volume ratio) was used.

Comparative Example 1

A bulk silicon and a stearic acid dispersing agent were mixed in an ethanol solvent at a mixing ratio of 90:10 by weight, and was distributed using a bead mill. This distribution was performed in order to obtain Si particles with an average size of 100 nm. Herein, the mixing ratio of the bulk silicon and the stearic acid dispersing agent was 9:1 by weight, and the amount of the ethanol solvent was selected to obtain a weight ratio of the silicon and the stearic acid dispersing agent and the ethanol solvent of 10:110.

The resulting mixture was homogeneously distributed for 30 minutes using a homogenizer.

Thereafter, the prepared homogeneous distributed liquid was spray dried using a spray nozzle. Herein, the spray drying was performed under a condition of a flow amount of the prepared homogeneous distributed liquid of 25 ml/min and a flow amount of a nozzle gas of 40 L/min, at 120° C.

The spray dried produced secondary particles of agglomerated primary particles having a substantially spherical shape.

33 wt % of the secondary particles and 67 wt % of the mesocarbon pitch were mixed and the mixture was heat treated at 800° C. under a $N_2$ atmosphere to prepare a first negative active material.

The prepared first negative active material included secondary particles of agglomerated primary particles, and the amorphous carbon surrounding the surface of the secondary particles. The primary particles included the Si particles and $ZrO_2$ on the surface of the Si particles in the form of the layer. The D50 average particle diameter of the Si particles was 100 nm, and the amount of the Si particles was 35 wt % based on the total weight, 100 wt % of the first negative active material. The amorphous carbon was on the surface of the secondary particles at a thickness of 200 nm, and the amount of the amorphous carbon was 65 wt % based on the total weight, 100 wt %, of the first negative active material.

98 wt % of a mixed active material of the first negative active material and a natural graphite second negative active material (12:88 weight ratio), 1 wt % of a styrene-butadiene rubber binder, and 1 wt % of carboxylmethyl cellulose as an agent for increasing viscosity were mixed in a water solvent to prepare a negative active material slurry. The produced negative active material slurry was coated on a Cu current collector, dried, and compressed to produce a negative electrode including a negative active material layer formed on the current collector.

Using the negative electrode, a lithium metal counter electrode, and an electrolyte, a half-cell was fabricated. As the electrolyte, a 1.5 M $LiPF_6$ solution in a mixed solvent of ethylene carbonate, dimethyl carbonate, and ethyl methyl carbonate (20:40:40 volume ratio) was used.

Reference Example 1

A first negative active material was prepared by the same procedure as in Example 1, except that $Zr(NO_3)_4$ was used in an amount such that the amount of the silicon and $Zr(NO_3)_4$ of 9:10.142 by weight provided Si:Zr of 1:0.2 by weight.

The prepared first negative active material included secondary particles of agglomerated primary particles, and the amorphous carbon surrounding the surface of the secondary particles. The primary particles included the Si particles and $ZrO_2$ on the surface of the Si particles in the form of the layer. Furthermore, $ZrO_2$ was in the amorphous carbon on the surface of the primary particles and the surface of the secondary particles. Herein, the D50 average particle diameter of the Si particles was 100 nm, the D50 average particle diameter of $ZrO_2$ was 15 nm, and the layer of $ZrO_2$ had a thickness of 20 nm. The amount of the Si particles was 57 wt % based on the total weight, 100 wt %, of the first negative active material, and the amount of $ZrO_2$ was 10 wt % based on the total weight, 100 wt %, of the first negative active material. The thickness of the amorphous carbon on the surface of the secondary particles was 200 nm, and the amount of the amorphous carbon was 33 wt % based on the total weight, 100 wt %, of the first negative active material.

98 wt % of a mixed active material of the first negative active material and a natural graphite second negative active material (12:88 weight ratio), 1 wt % of a styrene-butadiene rubber binder, and 1 wt % of carboxylmethyl cellulose as an agent for increasing viscosity were mixed in a water solvent to prepare a negative active material slurry. The produced negative active material slurry was coated on a Cu current collector, dried, and compressed to produce a negative electrode including a negative active material layer formed on the current collector.

Using the negative electrode, a lithium metal counter electrode, and an electrolyte, a half-cell was fabricated. As the electrolyte, a 1.5 M $LiPF_6$ solution in a mixed solvent of ethylene carbonate, dimethyl carbonate and ethyl methyl carbonate (20:40:40 volume ratio) was used.

Comparative Example 2

The first heat treatment product formed by first heat treatment at 350° C. under an air atmosphere for 1 hour in Example 1 was used as a negative active material. The prepared first negative active material included secondary particles of agglomerated primary particles, and the primary particles included the Si particles and $ZrO_2$ on the surface of the Si particles in the form of the layer. The D50 average particle diameter of the Si particles was 100 nm, the D50 average particle diameter of $ZrO_2$ was 15 nm, and the layer of $ZrO_2$ had a thickness of 20 nm. The amount of the Si particles was 97 wt % based on the total weight, 100 wt %, of the first negative active material, and the amount of $ZrO_2$ was 3 wt % based on the total weight, 100 wt %, of the first negative active material.

\* Measurement of XRD Characteristic

1) XRD Characteristic Measurement of Negative Active Material

Figure 3:
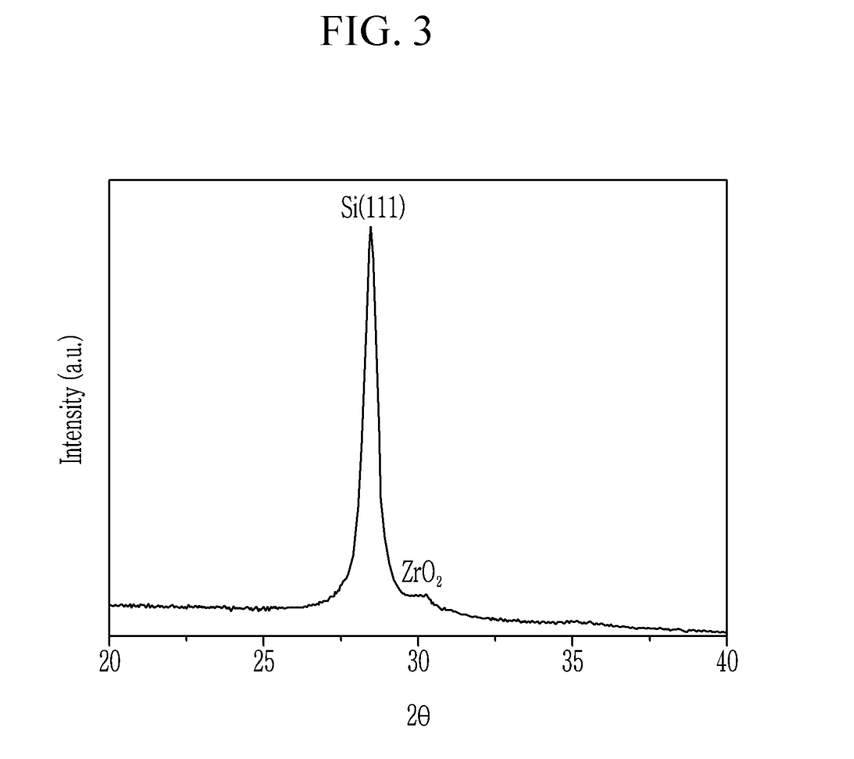
FIG. 3 is a graph showing X-ray diffraction peak results of the negative active material according to Example 1.

As for the negative active materials according to Examples 1 to 3, Comparative Examples 1 and 2, and Reference Example 1, an X-ray diffraction analysis (XRD) using a CuKα ray was measured to determine the peak intensity ratio ($I_{Si(111)}/I_{ZrO2}$) of a peak intensity ($I_{Si(111)}$) at a Si(111) plane relative to a peak intensity ($I_{ZrO2}$) of $ZrO_2$. The results are shown in Table 1. Among these results, the X-ray diffraction analysis result of Example 1 is shown in FIG. 3.

The X-ray diffraction analysis was performed under a condition of 2θ=10° to 50°, a scan speed (°/S) of 0.05, a step size (°/step) of 0.01313, and time per step of 62.475 s.

TABLE 1

| | Example 1 | Example 2 | Example 3 | Comparative Example 1 | Reference Example 1 | Comparative Example 2 |
|---|---|---|---|---|---|---|
| Peak intensity ratio ($I_{Si(111)}/I_{ZrO2}$) | 20 | 12 | 7 | 0 | 3 | 10 |

\* Measurement of Impedance

The half-cells according to Example 1, Comparative Example 1, and Reference Example 1 was charged and discharge once under a condition of SOC50 (SOC50: charged to be 50% of charge capacity based on 100% of the entire battery charge capacity).

Figure 4A:
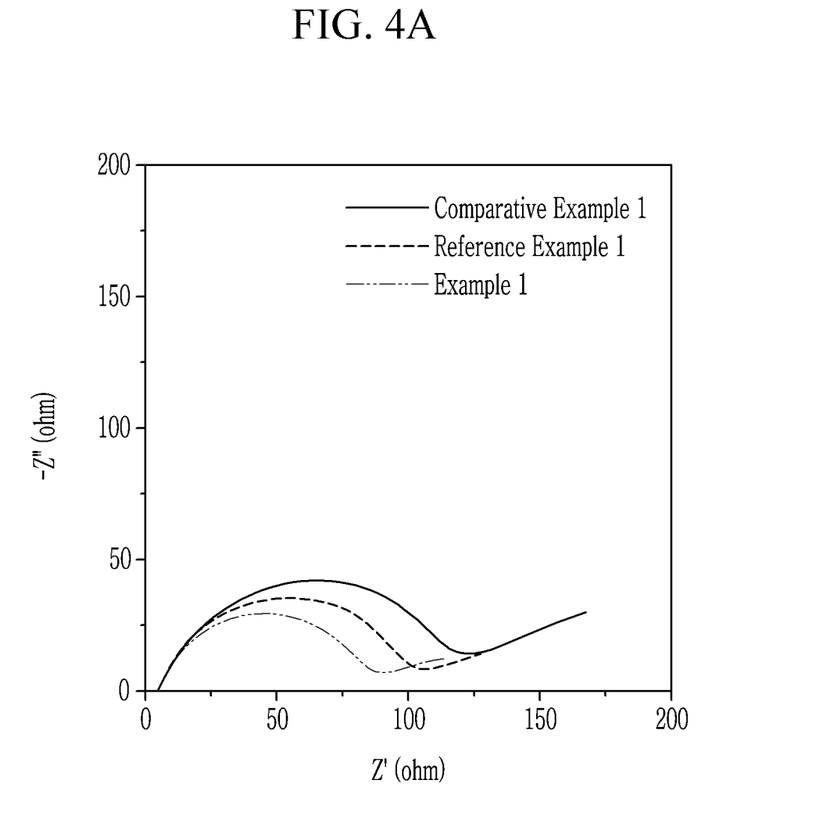
FIG. 4A is a graph showing impedance before charging and discharging of the negative electrode prepared by using the negative active materials according to Example 1, Comparative Example 1, and Reference Example 1.
Figure 4B:
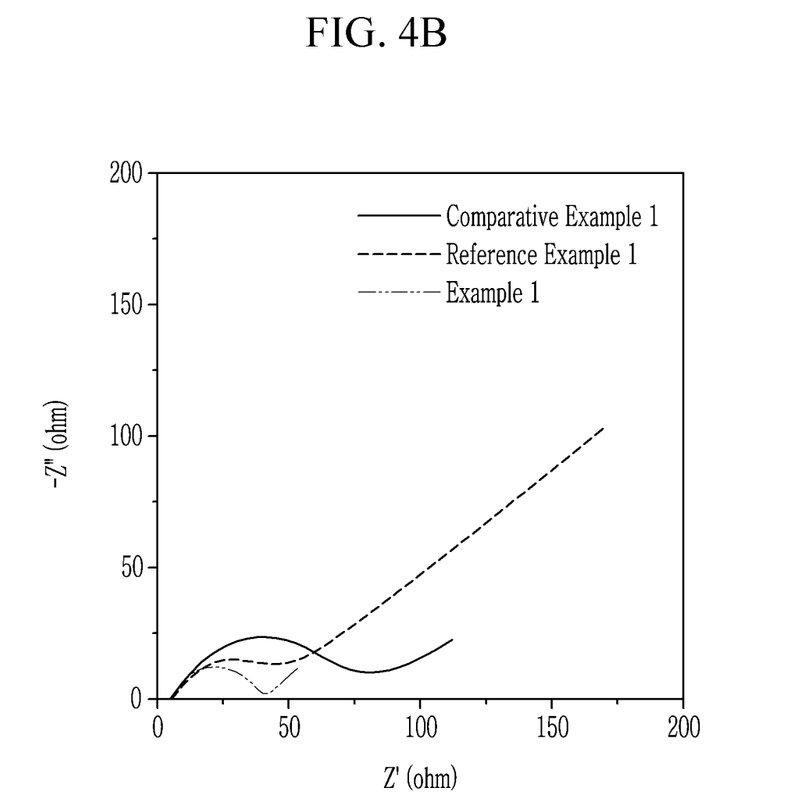
FIG. 4B is a graph showing impedance after charging and discharging of the negative electrode prepared by using the negative active materials according to Example 1, Comparative Example 1, and Reference Example 1.

The impedances before and after charging and discharging was measured under 1 MHz to 0.1 Hz (10 mV) using a Single Channel Electrochemical Workstation ZIVE SP2 (WONATECH Co., Ltd). The impedance before charging and discharging is shown in FIG. 4A, and the impedance after charging and discharging is shown in FIG. 4B. As shown in FIG. 4A and FIG. 4B, the impedance of the cell using the negative active material according to Example 1 was lower than that of Comparative Examples 1 and 2. Particularly, from FIG. 4B showing the impedance after charging and discharging, it may be seen that Example 1 using the amount of $ZrO_2$ of 1.5 wt % exhibited surprisingly low impedance, but Reference Example 1 using the large amount of $ZrO_2$ of 10 wt % exhibited significantly increased impedance.

\* Measurement of Cycle-Life Characteristic

Half-cells according to Example 1, Comparative Examples 1 and 2, and Reference Example 1 were charged and discharged at 0.5° C. 100 times, and the ratio of the $100^{th}$ discharge capacity relative to the $1^{st}$ discharge capacity was calculated. The results are shown in FIG. 5 as capacity retention.

Figure 5:
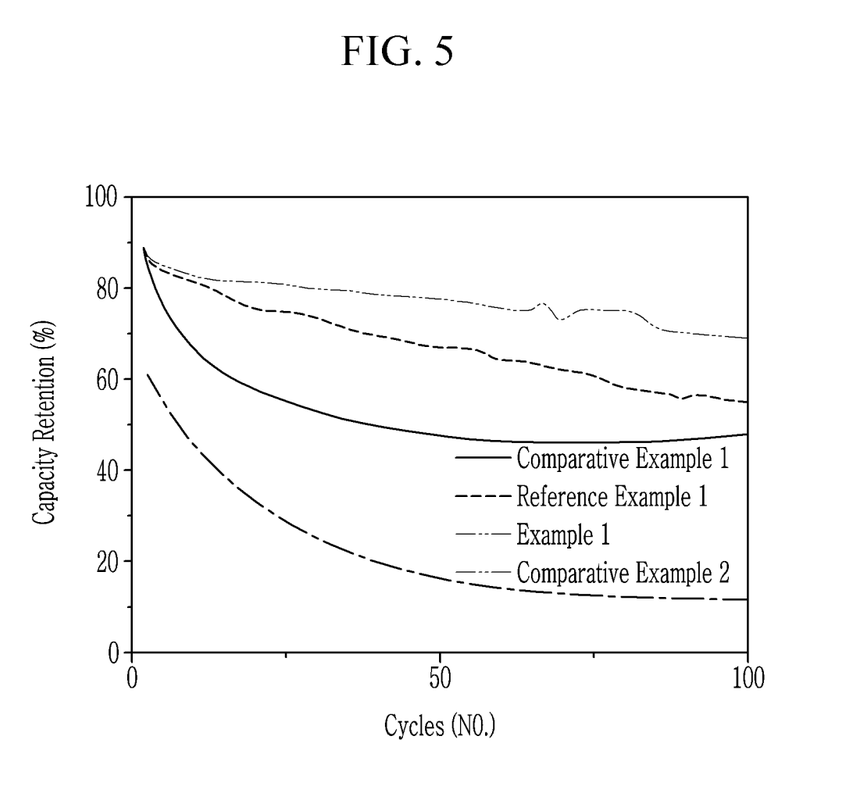
FIG. 5 is a graph showing the cycle-life characteristics of the half-cells fabricated by using the negative active material according to Example 1, Comparative Examples 1 and 2, and Reference Example 1.

As shown in FIG. 5, the half-cell according to Example 1 exhibited excellent capacity retention, compared to the half-cells according to Comparative Examples 1 and 2 and Reference Example 1.

Resultantly, the negative active material including secondary particles formed by agglomerating primary particles including the Si particles and $ZrO_2$ on the surface of the Si particles, and amorphous carbon surrounding the surface of the primary particles and the surface of the secondary particles (Example 1), exhibited better capacity retention, e.g., better cycle-life characteristics. Whereas, the negative active material with no $ZrO_2$ (Comparative Example 1), the negative active material with a large amount of $ZrO_2$, although it included both amorphous carbon and $ZrO_2$ (Reference Example 1), and the negative active material with only $ZrO_2$ and no amorphous carbon (Comparative Example 2), all exhibited the deteriorated cycle-life characteristics.

By way of summation and review, as a negative active material, various carbon negative active materials such as artificial graphite, natural graphite, hard carbon, and the like may be used. Such a carbon negative material may have a relatively low capacity of about 360 mAh/g, and a silicon negative active material having a capacity of 2,500 mAh/g or more, which is four or more times higher than the carbon negative active material, have been considered. Silicon may have severe volume expansion which may occur during charging and discharging (e.g., 300% relative to graphite) compared to the carbon negative active material, particularly graphite, and it may cause a side reaction with the electrolyte to severely occur, thereby consuming the electrolyte solution and resultantly deteriorating the cycle-life characteristic.

One or more embodiments may provide a negative active material for a rechargeable lithium battery exhibiting improved durability, suppressed volume expansion, and excellent cycle-life characteristics.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated.

Accordingly, it will be understood by those of skill in the art that various changes in form and details may be made without departing from the spirit and scope of the present invention as set forth in the following claims.

What is claimed is:

1. A negative active material for a rechargeable lithium battery, the negative active material comprising:
    secondary particles of agglomerated primary particles, the primary particles being Si particles and a first ceramic oxide on a surface of the Si particles; and
    amorphous carbon, the amorphous carbon further including a second ceramic oxide therein,
    wherein:
    the secondary particles have a D50 average particle diameter of about 4 μm to about 20 μm,
    the amorphous carbon surrounds a surface of the primary particles and a surface of the secondary particles,
    the Si particles include a non-compounded silicon core,
    the Si particles have an aspect ratio of about 3 to about 15,
    the first ceramic oxide includes $ZrO_2$,
    the second ceramic oxide is $ZrO_2$, $Al_2O_3$, or a combination thereof,
    the negative active material includes the first ceramic oxide in an amount of about 0.1 wt % to about 5 wt %, based on a total weight of the negative active material,
    a mixing ratio of the ceramic oxide and the silicon may be about 0.02:1 to about 0.5:1 by weight, and
    regarding the negative active material, a peak intensity ratio ((ISi(111)/I(ZrO2)) of a peak intensity (ISi(111)) at a Si(111) plane relative to a peak intensity ((I(ZrO2)) of the first ceramic oxide is about 7 to about 20, as measured by X-ray diffraction analysis using a CuKα ray.

2. The negative active material for a rechargeable lithium battery as claimed in claim 1, wherein the first ceramic oxide is in the form of:
    a continuous layer on the surface of the Si particles, or
    discontinuous islands or dots on the surface of the Si particles.

3. The negative active material for a rechargeable lithium battery as claimed in claim 1, wherein the first ceramic oxide on the surface of the Si particles has a thickness of about 50 nm or less.

4. The negative active material for a rechargeable lithium battery as claimed in claim 1, wherein particles of the second ceramic oxide have a size of about 30 nm or less.

5. The negative active material for a rechargeable lithium battery as claimed in claim 1, wherein the Si particle is a flake type particle.

6. The negative active material for a rechargeable lithium battery as claimed in claim 1, wherein the Si particles have a size of about 10 nm to about 200 nm.

7. The negative active material for a rechargeable lithium battery as claimed in claim 1, wherein a full width at half maximum, FWHM (111), of a diffraction peak at a (111) plane found by X-ray diffraction of the Si particles using a CuKα ray is about 0.4 degrees to about 5 degrees.

8. A rechargeable lithium battery, comprising:
    a negative electrode including the negative active material as claimed in claim 1;
    a positive electrode; and
    an electrolyte.

9. The negative active material for a rechargeable lithium battery as claimed in claim 1, wherein:
the first ceramic oxide includes $ZrO_2$, or
the second ceramic oxide includes $ZrO_2$.

* * * * *